United States Patent [19]

Kawai et al.

[11] Patent Number: 5,335,115
[45] Date of Patent: Aug. 2, 1994

[54] LENS BARREL

[75] Inventors: Tohru Kawai, Kawasaki; Masahisa Tamura, Yokohama; Ryuji Suzuki, Yokohama; Haruhiko Yamanouchi, Yokohama, all of Japan

[73] Assignee: Canon Kabushiki Kaisha, Tokyo, Japan

[21] Appl. No.: 28,605

[22] Filed: Mar. 8, 1993

Related U.S. Application Data

[63] Continuation of Ser. No. 483,764, Feb. 23, 1990, abandoned.

[30] Foreign Application Priority Data

| Feb. 23, 1989 | [JP] | Japan | 1-44001 |
| Mar. 28, 1989 | [JP] | Japan | 1-75933 |
| Mar. 28, 1989 | [JP] | Japan | 1-75934 |
| Mar. 28, 1989 | [JP] | Japan | 1-75935 |

[51] Int. Cl.⁵ .......... G02B 15/14; G02B 7/02
[52] U.S. Cl. .......... 359/696; 359/694; 359/823
[58] Field of Search .......... 350/247, 252, 255, 257, 350/429, 430; 359/694–706, 819–830; 354/187–195.12, 214, 288, 400–408

[56] References Cited

U.S. PATENT DOCUMENTS

| 4,445,757 | 5/1954 | Enomoto et al. | 359/696 |
| 4,461,344 | 2/1984 | Isobe et al. | 359/823 |
| 4,514,039 | 4/1985 | Kawai | 350/255 |
| 4,515,438 | 5/1985 | Ohnuki | 350/255 |
| 4,626,077 | 12/1986 | Yamamoto | 359/696 |
| 4,682,854 | 7/1987 | Hanamori | 350/255 |
| 4,764,783 | 8/1988 | Tanaka | 350/255 |
| 4,789,225 | 12/1988 | Nomura | 350/255 |
| 4,793,689 | 12/1988 | Aoyagi et al. | 359/696 |
| 4,844,586 | 7/1989 | Suzuki et al. | 350/247 |
| 4,865,438 | 9/1989 | Aoyagi et al. | 359/696 |
| 4,910,544 | 3/1990 | Nomura | 350/255 |
| 4,948,227 | 8/1990 | Takeyasu | 350/255 |
| 4,963,000 | 10/1990 | Kawai | 359/824 |
| 5,052,781 | 10/1991 | Iizuka | 359/823 |

FOREIGN PATENT DOCUMENTS

| 70934 | 3/1989 | Japan | 359/823 |

*Primary Examiner*—Loha Ben
*Assistant Examiner*—Thong Nguyen
*Attorney, Agent, or Firm*—Fitzpatrick, Cella, Harper & Scinto

[57] ABSTRACT

A lens barrel includes a vibrating motor which serves as a driving source, a rotating member driven by the vibrating motor, a bearing mechanism for rotatably supporting the rotating member, and a urging member for urging the rotating member and the roller in a direction in which they make contact with each other. The bearing mechanism includes a roller having an axis which lies in a radial direction of an axis of the vibrating motor.

33 Claims, 10 Drawing Sheets

LENS BARREL

This application is a continuation of application Ser. No. 07/483,764 filed Feb. 23, 1990 now abandoned.

BACKGROUND OF THE INVENTION

1. Field of the Invention

The present invention relates to a lens barrel which incorporates a motor such as a vibrating motor.

2. Description of the Related Art

Vibrating motors which operate on a principle quite different from that of conventional electromagnetic motors have been developed recently, and researches on the practical applications of such vibrating motors in various fields have been conducted. Such applications include the use of a vibrating motor in an optical device such as a camera, specifically a lens barrel.

Figure 4:
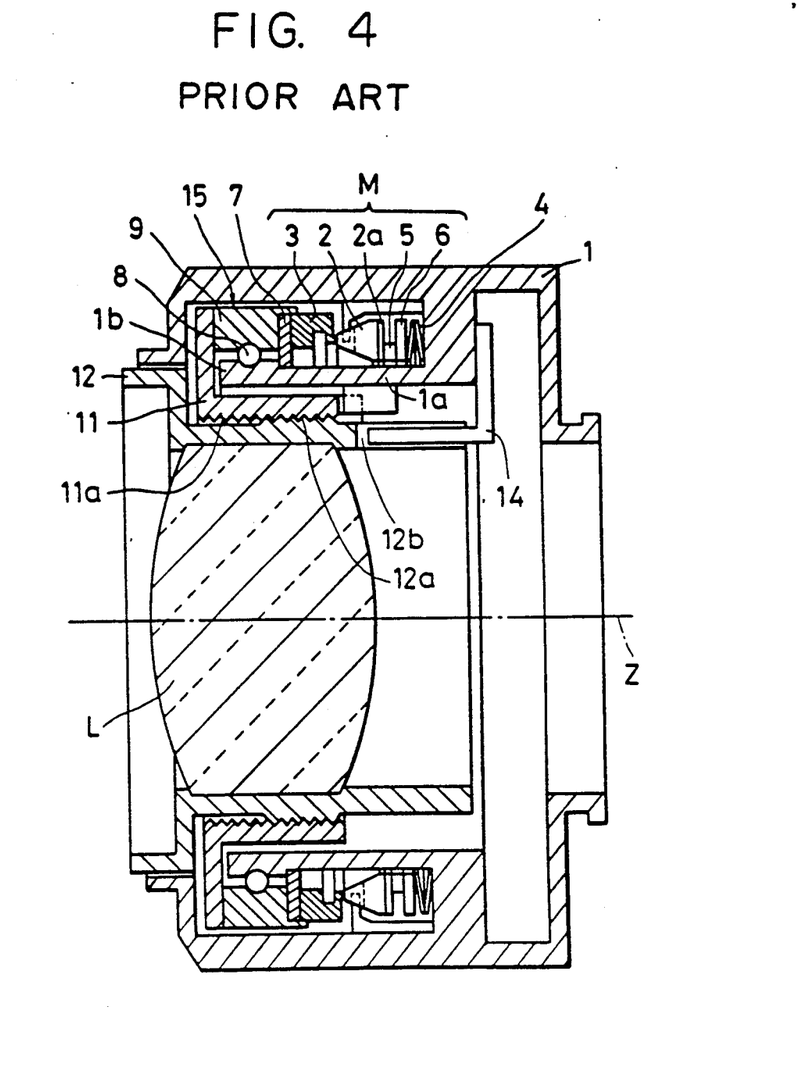
FIG. 4 is a vertical cross-sectional view of the essential parts of a lens barrel upon which the present invention is based.

FIG. 4 is a schematic cross-sectional view of a lens barrel incorporating an annular vibrating motor M, upon which the present invention is based. In FIG. 4, a reference numeral 1 denotes a fixed, double-skinned cylinder having an inner cylindrical portion 1a, a reference symbol M denotes an annular vibrating motor fitted on the outer peripheral surface of the inner cylindrical portion 1a, and a reference numeral 15 denotes a bearing for supporting a rotor of the motor M.

The vibrating motor M is composed of an annular vibrating member 2 which is a ring having a trapezoidal cross-section, an electrostrictive element 2a formed integrally with the vibrating member 2, an annular rotor 3 pressing against the end surface of the vibrating member 2, an annular felt 5 pressing against the end surface of the electrostrictive element 2a, an annular felt base 6 to which the felt 5 is fixed, an annular belleville spring 4 for pressing the vibrating member 2 toward the end surface of the rotor 3, and so on.

The bearing 15 is coupled to the rotor 3 with a vibration absorbing member 7 therebetween. The bearing 15 is composed of an outer rotating ring 9 having a spherical member rolling surface on its inner peripheral surface, an inner fixed ring 1b formed by the distal end portion of the inner cylindrical portion 1a of the fixed cylinder 1, and spherical members 8 disposed between the outer rotating ring 9 and the inner fixed ring 1b.

A rotating cylinder 11 having a threaded portion 11a on an inner peripheral surface thereof is coupled to the outer rotating ring 9 of the bearing 15, so that the rotation cylinder can be rotated around an axis Z of the motor 2 together with the outer rotating ring 9.

A lens holder 12 for holding a lens L has on an outer peripheral surface thereof a threaded portion 12a, which is in threaded engagement with the threaded portion 11a formed on the inner peripheral surface of the rotating cylinder 11. In consequence, rotation of the rotating cylinder 11 moves the lens holder 12 in a direction parallel to the axis Z. A groove 12b is formed on the outer peripheral surface of the lens holder 12 parallel to the axis Z. A key or rotation suspending member 14, having an L-shaped form and mounted on the fixed cylinder 1, is fitted into the groove 12b in such a manner as to be movable relative to the lens holder 12 in the direction of axis Z.

The thus-arranged lens barrel shown in FIG. 4 incorporates as the motor bearing a spherical bearing member 8. Hence, manufacture of the bearing requires troublesome work and the production cost thereof is high.

SUMMARY OF THE INVENTION

An object of the present invention is to provide a lens barrel which incorporates as a bearing a roller rotatable about an axis running in a radial direction of an axis of a motor so as to reduce production cost of the bearing.

To this end, the present invention provides a lens barrel which comprises a vibrating motor which is a driving source, a rotating member driven by the vibrating motor, a bearing mechanism for rotatably supporting the rotating member, and an urging member for urging the rotating member and the rollers such that they make contact with each other. The bearing mechanism includes a roller having an axis in a radial direction of an axis of the vibrating motor.

DETAILED DESCRIPTION OF THE PREFERRED EMBODIMENTS

Figure 1:
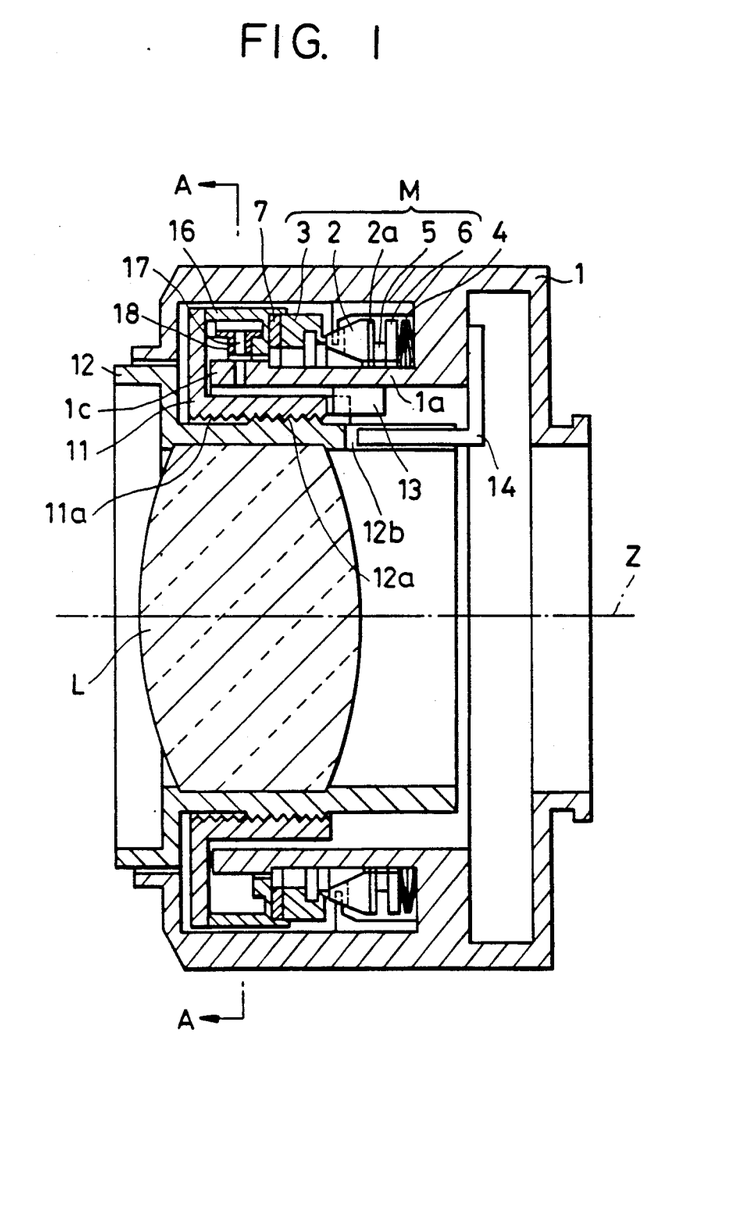
FIG. 1 is a vertical cross-sectional view of the essential parts of a lens barrel, showing a first embodiment of the present invention.

A first embodiment of the present invention will now be described below with reference to FIGS. 1 to 3 wherein the same reference numerals and symbols are used to denote parts which are the same as those of the lens barrel shown in FIG. 4, description thereof being omitted.

In the first embodiment of the lens barrel, three roller supporting shafts 17 protrude from a distal end portion 1c of the inner cylindrical portion 1a of the fixed cylinder 1 in a radial direction of the axis Z (which corresponds to an optical axis). A hollow roller 18 is rotatably fitted onto each of the roller supporting shafts 17. A rotating member 16, which is coupled to the rotor 3 of the vibrating motor 2 with the vibration absorbing member 7 therebetween, is pressed against the outer peripheral surfaces of the hollow rollers 18 by means of the force of the belleville spring 4.

Figure 2:
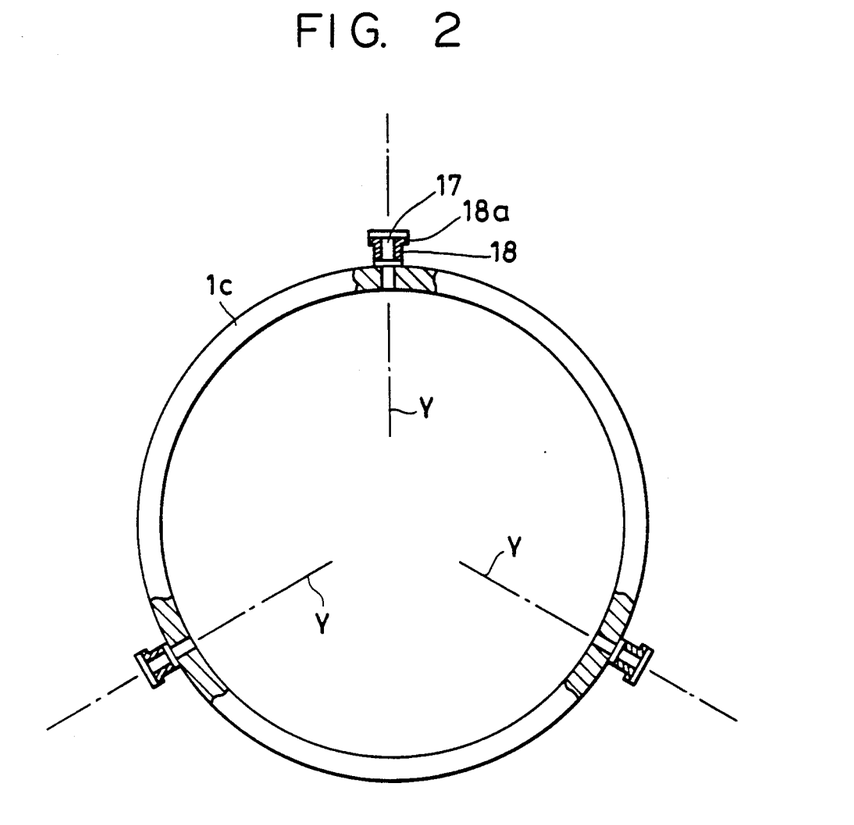
FIG. 2 is a section taken along the line A—A of FIG. 1 showing only the rollers, support shafts and inner cylinder as seen when looking in the direction of the arrows.

As shown in FIG. 2, each of the hollow rollers 18 has an upper flange 18a, which is in engagement with a shoulder formed on the rotating member 16. This prevents backlash of the rotating member 16 which would occur in a radial direction during the rotation thereof.

Each of the roller supporting shafts 17 has flanges at head and intermediate portions thereof. The head flange of the roller supporting shaft 17 prohibits the hollow roller 18 from coming off the shaft 17.

In the aforementioned bearing structure incorporating the hollow rollers 18, the rollers 18 rotate about the individual roller supporting shafts 17 while making rolling contact with the rotating member 16 without sliding against the rotating member 16 if the following conditions are satisfied:

$$\mu_1 \geq \mu_2$$

where $\mu_1$ is a coefficient of friction between the roller 18 and the rotating member 16, and $\mu_2$ is a coefficient of friction between the roller 18 and the roller supporting shaft 17. These operations of the rollers are assured when the rollers are hollow.

Figure 3:
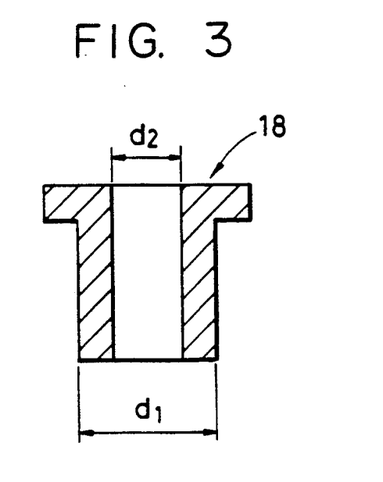
FIG. 3 is a vertical cross-sectional view of a hollow roller.

As shown in FIG. 3, a shaft portion of the hollow roller 18 (i.e., the portion of the hollow roller 18 which is in contact with the rotating member 16) has an outer diameter $d_1$ and an inner diameter $d_2$. It is assumed that $\mu_1 = \mu_2$.

If F is a force of the belleville spring 4, the maximum torque transmitted when the roller 18 makes rolling contact with the rotating member 16 without sliding against the rotating member 16 is expressed by $$\frac{\mu_1 d_1 F}{2}.$$

Limitation of the torque at which no relative rotation occurs between the roller 18 and the roller supporting shaft 17 is expressed by $$\frac{\mu_1 d_2 F}{2}. \text{ Hence, } \frac{\mu_1 d_1 F}{2} > \frac{\mu_1 d_2 F}{2}$$

holds. This means that, while the roller 18 is in rolling contact with the rotating member 16, the roller 18 rotates (slides around) about the roller supporting shaft 17.

Furthermore, since a ratio of torque loss when the roller 18 revolves on its own axis to torque loss when the roller 18 does not revolve on its own axis is $$\frac{\mu_1 d_2 F}{2} / \frac{\mu_1 d_1 F}{2} = \frac{d_2}{d_1},$$

torque loss can be reduced by adequately setting the outer diameter of the roller 18 with respect to the inner diameter thereof.

Figure 5:
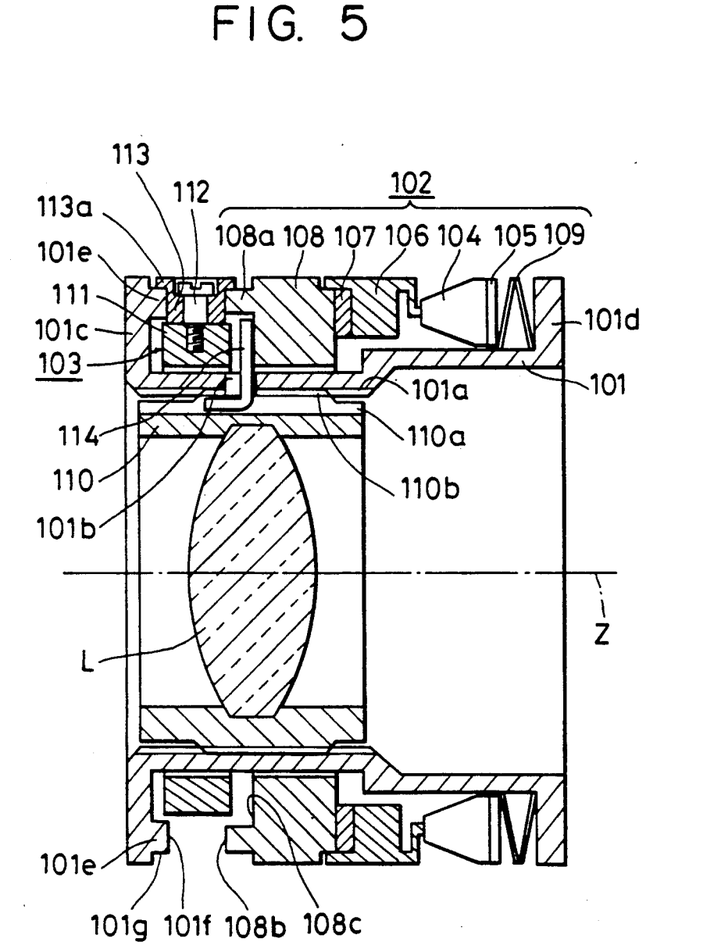
FIG. 5 is a vertical cross-sectional view of the essential parts of a lens barrel, showing a second embodiment of the present invention.

A second embodiment of the present invention will be described with reference to FIG. 5. In FIG. 5, a reference numeral 101 denotes a fixed cylinder which is internally disposed in a lens barrel. The fixed cylinder 101 has a threaded portion 101a (i.e., a female helicoid) on an inner peripheral surface thereof. Inside the fixed cylinder 101 is disposed a cylindrical lens holder 110 having a threaded portion 110b (i.e., a male helicoid) on an outer peripheral surface thereof, which is meshed with the threaded portion 101a of the fixed cylinder 101. A lens L is fixed to the lens holder 110. A groove 110a is formed in the outer peripheral surface (i.e., in the threaded portion 110b) of the lens holder 110 parallel to an optical axis Z of the lens. A lens holder driving arm 114 (or a key) having an L-shaped form is inserted into the groove 110a from the outer peripheral side of the fixed cylinder 101 through a through-hole 101b formed in the fixed cylinder 101 in such a manner that it is elongated in a circumferential direction of the fixed cylinder 101. The lens holder driving arm 114 is movable in the groove 110a relative to the lens holder 110 only in a direction parallel to the optical axis Z.

The fixed cylinder 101 is a power unit carrier which carries on it an annular vibrating motor 102 and a bearing device 103 for the motor 102. The fixed cylinder 101 has outwardly directed flanges 101c and 101d on the outer peripheral surface of the two end portions thereof, and all the components of the vibrating motor 102 and those of the bearing device 103 are fixed to the portion of the fixed cylinder located between the flanges 101c and 101d by means of the force of a spring 109, which is one component of the vibrating motor 102.

The vibrating motor 102 is composed of an annular vibrating member 104 having a trapezoidal cross-section, the center of the annular vibrating member 104 being the optical axis Z, an annular electrostrictive element 105 attached to the vibrating member 104, an annular first rotor member 106 which is in contact with the end surface of the vibrating member 104, an annular second rotor member 108 formed integrally with the first rotor member 106 with an annular vibration absorbing member 107 therebetween, the annular spring 109 disposed between the flange 101d of the fixed cylinder 1 and the electrostrictive element 105 for pressing the vibrating member 104 against the first rotor member 106 and for pushing the second rotor member 108 to a left, as viewed in FIG. 5, and so on. The first rotor member 106, the vibration absorbing member 107 and the second rotor member 108, in combination, form the rotor of the motor 102, which rotate around the optical axis Z. The second rotor member 108 has at its end surface an annular protrusion 108a, which is in contact with the outer peripheral surface of a roller 113 of the bearing device 103, which will be described later. The second rotor member 108 also has an end surface 108c on the inner side of the protrusion 108a, to which one end of the lens holder driving arm 114 is fixed.

The bearing device 103, which is disposed between the second rotor member 108 and the flange 101c of the fixed cylinder 101, is composed of a ring-shaped rotating member 111 fitted onto the outer peripheral surface of the fixed cylinder 101 in such a manner as to be rotatable around the optical axis Z, roller supporting shafts 112 protruding from the outer peripheral surface of the rotating member 111 in a radial direction of the optical axis Z, and hollow rollers 113 rotatably fitted onto the individual roller supporting shafts 112. The roller supporting shafts 112 are fixedly screwed into the rotating member 111 along the circumference thereof at at least three points separated from each other by the same interval.

The flange 101c of the fixed cylinder 101 has an annular protrusion 101e whose center is the optical axis Z. The protrusion 101e is disposed such that it faces the protrusion 108a of the second rotor member 108 of the vibrating motor 102. The protrusion 101e serves as a roller rolling and guiding surface when the rollers 113 are rotated around the optical axis Z.

Each of the rollers 113 has a flange 113a at its head portion, the under surface of which is in engagement with the outer peripheral surface of the protrusion 108a of the second rotor member 108 and that of the protrusion 101e. This prevents backlash of the second rotor member 108, which would occur in a radial direction during the rotation thereof. Furthermore, the outer peripheral surface of each of the rollers 113 is in contact with an end surface 108b of the protrusion 108a of the second rotor member 108 and an end surface 101f of the protrusion 101e of the fixed cylinder 101, so that the end surface 108b of the protrusion 108a of the second rotor member 108 can be pressed against the outer peripheral surface of each of the rollers 113 and the outer peripheral surface of the roller 113 can be in turn pressed against the end surface 101f of the protrusion 101e of the fixed cylinder 101 by means of the force of the spring 109 incorporated in the vibrating motor 102. The end surface 101f of the protrusion 101e of the fixed cylinder 101 serves as a rolling surface along which the rollers 113 are rolled, and an outer peripheral surface 101g of the protrusion 101e serves as a roller guiding surface along which the rollers 113 are rolled when they are rotated around the optical axis Z.

Next, the operation of the mechanism of the second embodiment will be described with reference to FIG. 5.

As a motor driving signal is applied to the electrostrictive element 105 of the vibrating motor 102, the electrostrictive element 105 generates in the vibrating member 104 vibrations which propagate in a circumferential direction thereof, resulting in the rotation of the rotor, which is composed of the first and second rotor members 106 and 108, around the optical axis Z. As a result, the lens holder driving arm 114 fixed to the second rotor member 108 is rotated together with the second rotor member 108, rotating and moving the lens holder 110 along the optical axis Z for focusing the lens.

As the second rotor member 108 is rotated around the optical axis Z, the rollers 113 are subjected to torque with which they are rotated around the roller supporting shafts 112 and a driving force with which they are rotated in the direction of rotation of the rotor member 108 due to the friction between the rollers 113 and the end surface 108b of the rotor member 108, and are thus rotated about the roller supporting shafts 112 and, at the same time, are rolled along the end surface 101f of the protrusion 101e of the fixed cylinder 101 in the longitudinal direction of the end surface 101f. In consequence, the rotating member 111 is also subjected to torque with which it is rotated around the optical axis Z through the rollers 113 and the roller supporting shafts 112, and is thus rotated around the optical axis Z.

Figure 6:
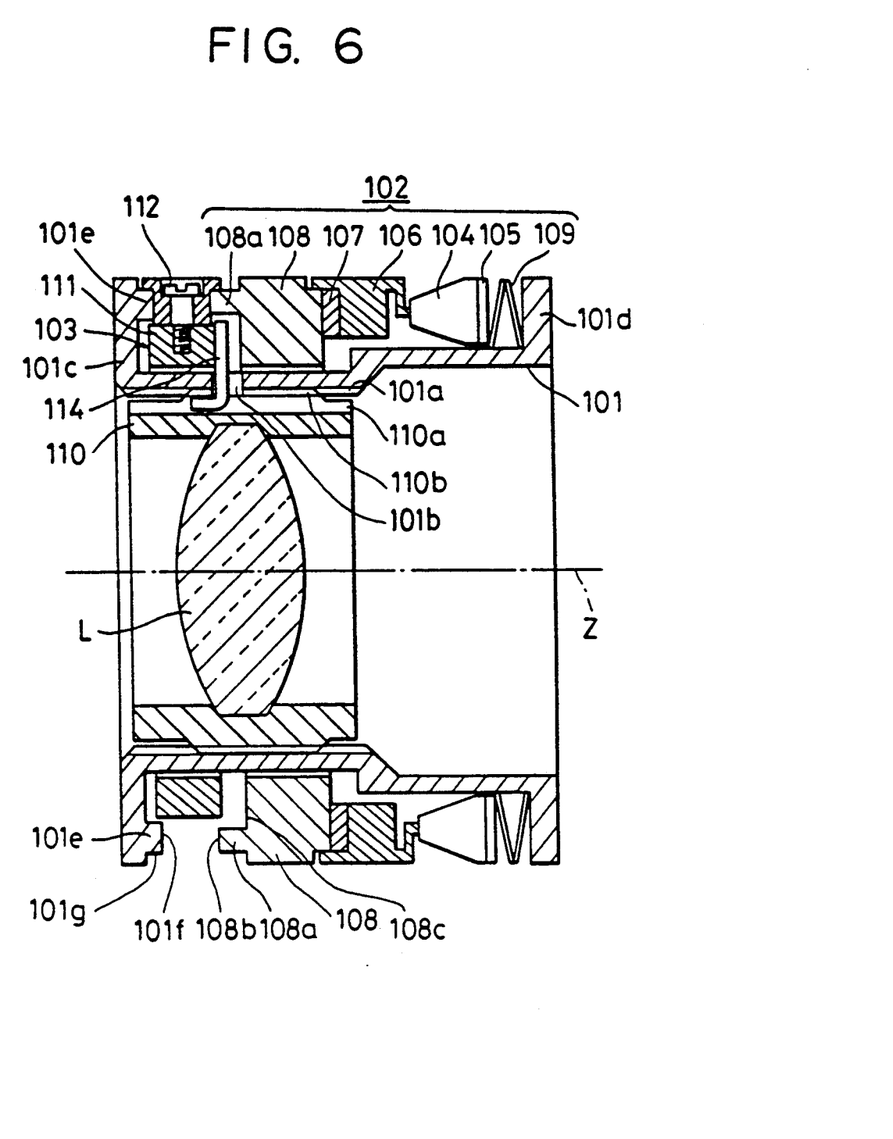
FIG. 6 is a vertical cross-sectional view of the essential parts of a lens barrel, showing a third embodiment of the present invention.

FIG. 6 shows a third embodiment of the present invention. This embodiment differs from that shown in FIG. 5 only in that the lens holder driving arm 114 is mounted on the rotating member 111, description of the structure and of the operation thereof being omitted.

Figure 7:
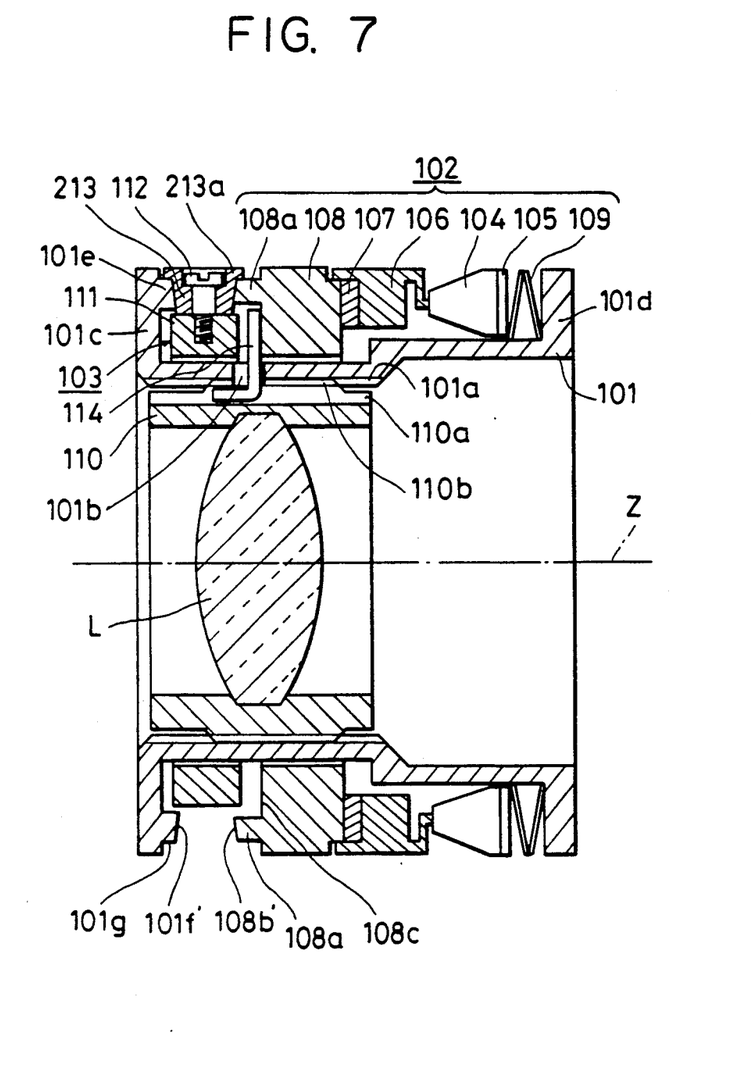
FIG. 7 is a vertical cross-sectional view of the essential parts of a lens barrel, showing a fourth embodiment of the present invention.

Next, a fourth embodiment of the present invention will be described with reference to FIG. 7. This embodiment differs from the second embodiment in that the rollers have a different form.

Each of rollers 213 has a flange 213a at an head portion thereof, and is tapered with the diameter of the head portion thereof being larger than that of the other end thereof. The under surface of the flange 213a is in engagement with the outer peripheral surface of the protrusion 108a of the second rotor member 108 and that of the protrusion 101e. This prevents backlash of the second rotor member 108, which would occur in a radial direction when it is rotated. Furthermore, the outer peripheral surface of the roller 213 is in contact with an end surface 108b' of the protrusion 108a of the second rotor member 108 and an end surface 101f' of the protrusion 101e of the fixed cylinder 101 (the end surfaces 108b' and 101f' being tapered so that they fit to the outer peripheral surface of each of the rollers 213), so that the end surface 108b' of the protrusion 108a of the second rotor member 108 can be pressed against the outer peripheral surface of each of the rollers 213 and the outer peripheral surface of the roller 213 can be in turn pressed against the end surface 101f' of the protrusion 101e of the fixed cylinder 101 by means of the pressure of the spring 109 incorporated in the vibrating motor 102. The end surface 101f' of the protrusion 101e of the fixed cylinder 101 serves as a rolling surface along which the rollers 213 are rolled, and the outer peripheral surface 101g of the protrusion 101e serves as a roller guiding surface along which the rollers are guided when they are rotated around the optical axis Z.

The end surface 101f' of the protrusion 101e and the end surface 108b' of the second rotor member 108, which are in contact with the outer peripheral surface of each of the rollers 213, are inclined so that they fit the tapered rollers 213. This enables the rollers 213 to be rotated on their own axes (i.e., the axes of the roller supporting shafts 112) in a radial direction relative to the optical axis Z.

Figure 8:
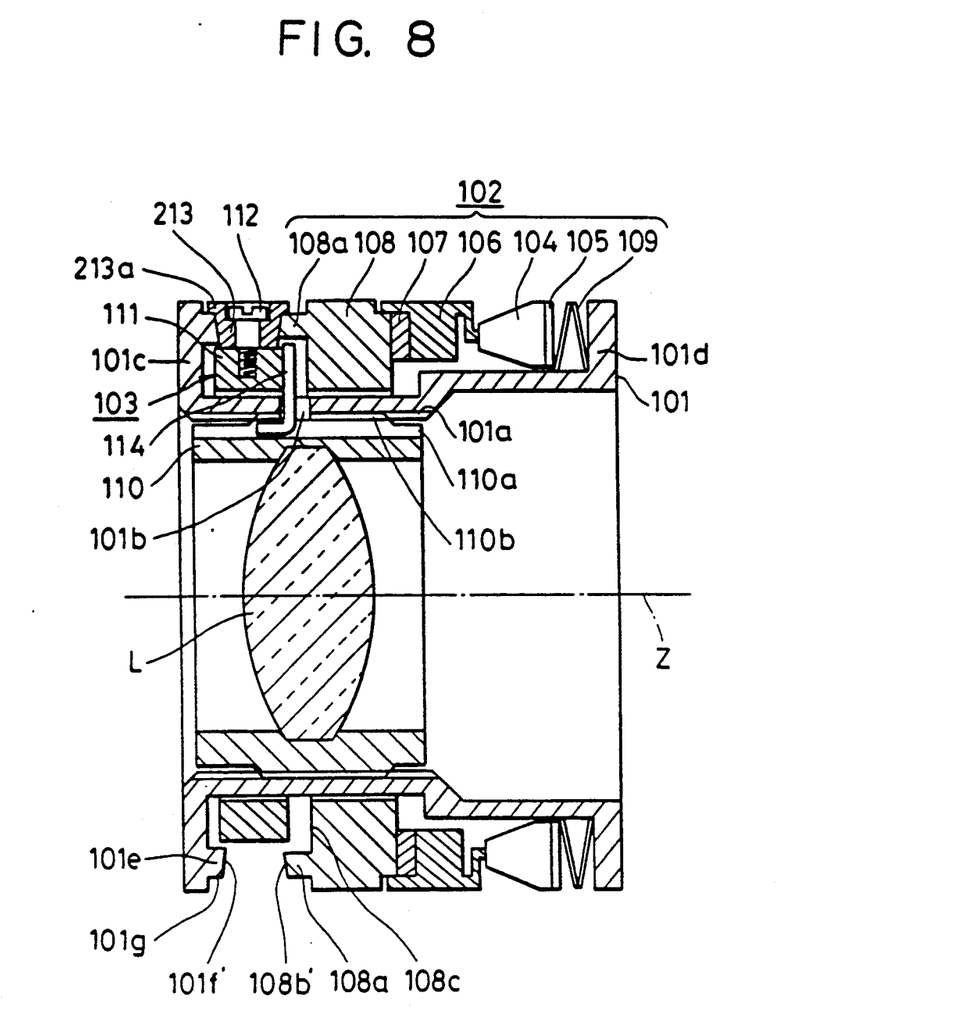
FIG. 8 is a vertical cross-sectional view of the essential parts of a lens barrel, showing a fifth embodiment of the present invention.

FIG. 8 shows a fifth embodiment of the present invention, which differs from the fourth embodiment in that the lens holder driving arm 114 is mounted on the rotating member 111.

As will be understood from the foregoing description, the aforementioned embodiments include a roller bearing which can be manufactured at a low cost than a spherical bearing.

Furthermore, the roller carrying member is made rotatable about the axis of the motor so as to eliminate sliding friction between the rollers and the individual roller supporting shafts. Consequently, frictional loss as well as production cost can be reduced.

Furthermore, each of the rollers has a tapered periphery, and the rotor end surface and the roller rolling surface, which are in contact with the outer peripheral surfaces of the rollers, are inclined so that they fit the tapered peripheries of the rollers. Consequently, no sliding occurs between the rollers and the rotating member (including the rotor end surface) which are in contact with the rollers, and eccentric vibrations of the motor can be eliminated. These enable an effective power of the motor for the lens barrel to be increased.

Furthermore, since the rollers (rollers 18, 113, 213 in the embodiments) and the end surface of the rotating member or the end surface of the rotor (which is the end surface of the protrusion 108a of the second rotor member in the embodiments) are pressed against each other by the force of the spring (the spring 4, 109 in the embodiments) incorporated in the motor, frictional loss of the roller bearing can be reduced. In other words, in the aforementioned embodiments, frictional loss of the roller bearing can be reduced by utilizing the force of the spring incorporated in the vibrating motor without incorporating a separate spring.

Furthermore, the rollers are disposed in a radial area substantially the same as the area of the hollow vibrating motor (i.e., the area which is moved parallel to the optical axis from the area of the vibrating motor). Consequently, space in the lens barrel can be utilized effectively, and the use of the rollers having axes in the radial direction does not increase the outer diameter of the lens barrel.

It is not necessary for the roller rolling surface of the rollers to be formed in a cylindrical form but it may be formed as a member which is rotatable about the optical axis.

Next, a sixth embodiment of the present invention will be described below with reference to FIGS. 9 to 11.

Figure 9:
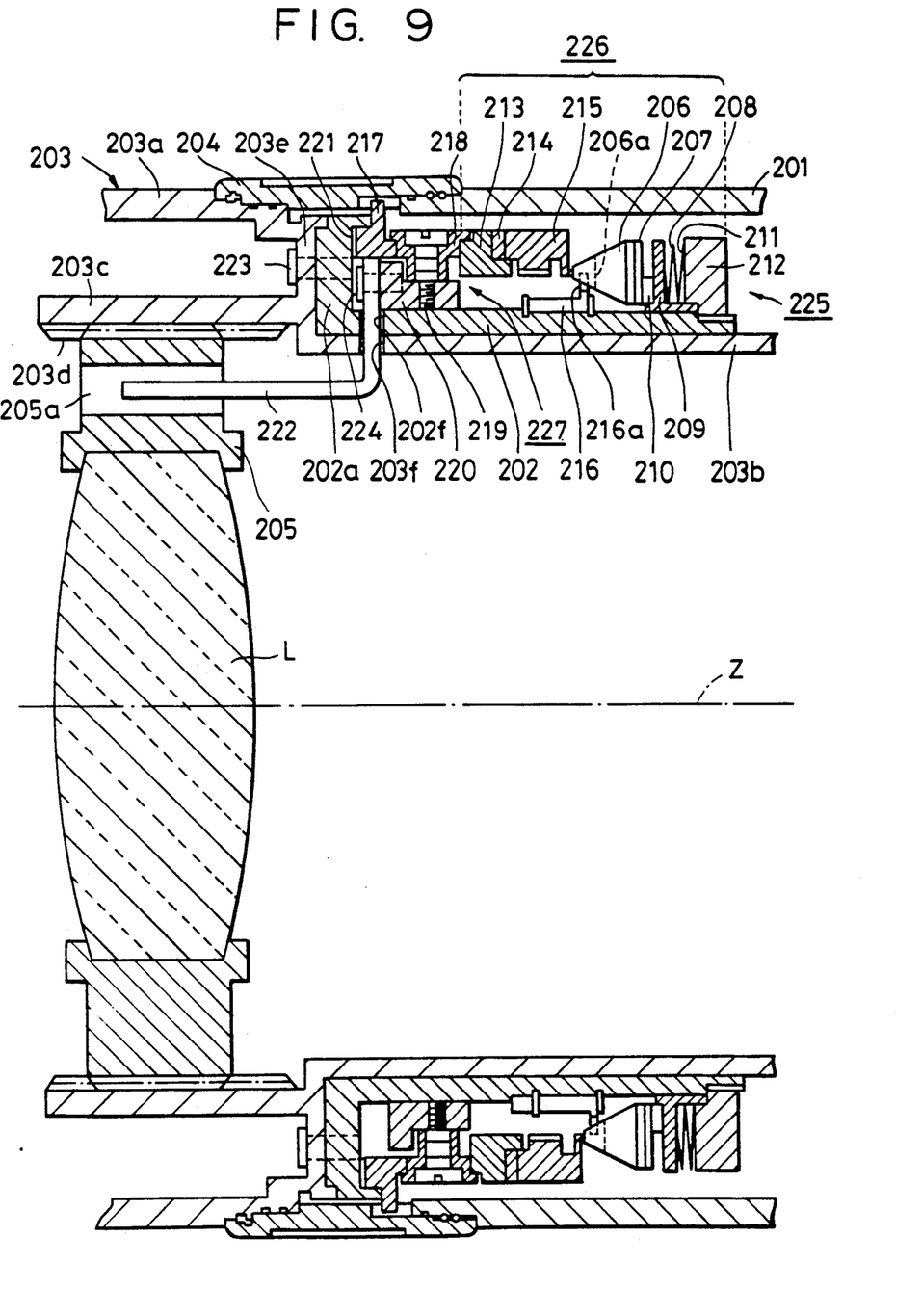
FIG. 9 is a vertical cross-sectional view of the essential parts of a lens barrel, showing a sixth embodiment of the present invention.
Figure 10:
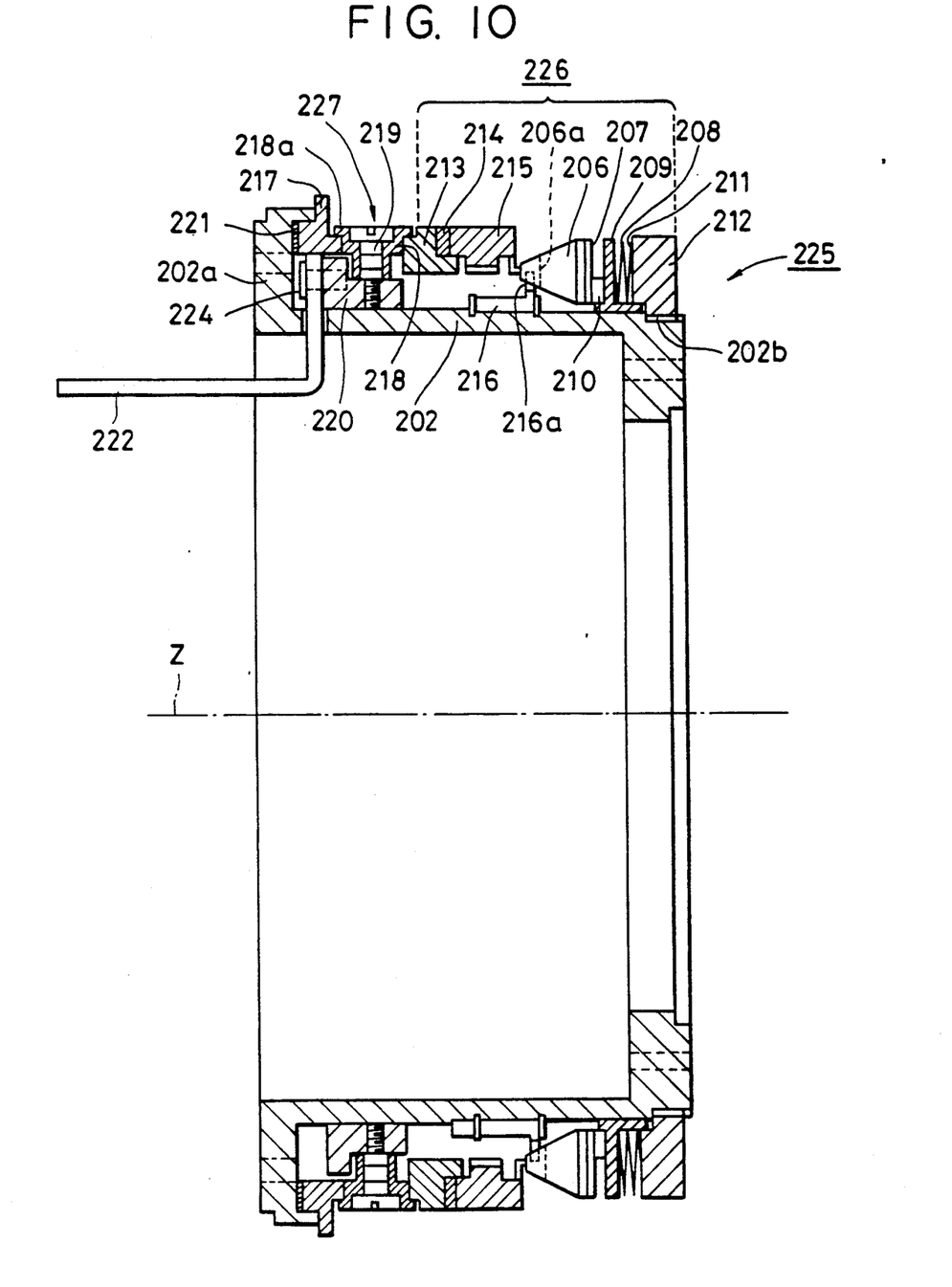
FIG. 10 is a vertical cross-sectional view of a power unit of the lens barrel of FIG. 9.

Referring first to FIGS. 9 and 10, a lens barrel includes an outer cylinder 201, a fixed cylinder 203 comprising an outer cylinder portion 203a disposed in front of the outer cylinder 201, an inner cylinder portion 203b disposed on an inner side of the outer cylinder 201, and a helicoid formed portion 203c disposed on an inner side of the outer cylinder portion 203a, a lens holder 205 threadingly engaged with a hellcold 203d formed on the inner peripheral surface of the helicoid formed portion 203c of the fixed cylinder 203, a lens L fixed to the lens holder 205, and a manually operated ring 204 fitted into a circumferential groove formed in the outer peripheral surface of the outer cylinder portion 203a of the fixed cylinder 203 and a circumferential groove formed in the outer peripheral surface of the outer cylinder 201 in such a manner as to be rotatable about the central axis Z of the lens L (i.e., the optical axis). The lens holder 205 includes a through-hole 205a extending in the radial direction of the optical axis, and a lens holder driving arm 222, which will be described later, is inserted into the through-hole 205a in such a manner that part of the arm 222 is parallel to the optical axis Z and as to be slidable relative to the lens holder 205 only in the circumferential direction of the lens L.

In an annular space formed between the outer cylinder 201 and the inner cylinder portion 203b of the fixed cylinder 203 are disposed a cylindrical drive generating unit 225 such as that shown in FIG. 10, and a cylindrical member 202, which serves as a frame or a base of the drive generating unit 225. The cylindrical member 202 includes a flange portion 202a, which is detachably secured to a flange portion 203e of the fixed cylinder 203 by means of a vis 223.

As shown in FIG. 10, the cylindrical member 202 mounts on its outer peripheral surface all the components of a vibrating motor 226, a bearing 227 which is in contact with a rotor of the vibrating motor 226, and a manually operated force inputting ring 217 through which rotational torque of the manually operated ring 204 is input.

The components of the vibrating motor 226 and the structure of the bearing 227 will be described in detail below.

The vibrating motor 226 is composed of an annular vibrating member 206 having a trapezoidal cross-section, an electrostrictive element 207 physically attached to one end surface of the vibrating member 206, an annular vibration absorbing member 210 which may be formed of a felt and which is pressed against the surface of the electrostrictive element 207, an annular spacer 209 disposed in contact with one end surface of the vibration absorbing member 210, an annular belleville spring 208 for urging the spacer 209 toward the vibrating member 206, an annular nut 212 threadingly engaged with a threaded portion 202b formed on the outer peripheral surface of the cylindrical member 202, an annular washer 211 disposed between the nut 212 and the belleville spring 208, a rotary cylinder 213 which is part of the rotor of the vibrating motor 226, a rubber ring 214 for preventing axial vibrations from being transmitted to the rotary cylinder 213, an annular circumferentially movable member 215, a vibration member rotation suspending member 216 fitted into the cylindrical member 202 at one end thereof, the member 216 having a protrusion 216a on its outer peripheral edge which is fitted into a groove 206a formed in the vibrating member 206, and other components.

The rotary cylinder 213, the rubber ring 214 and the circumferentially movable member 215 in combination form the rotor of the vibrating motor 226, which is rotated around the optical axis Z by means of vibrations generated in the vibrating member 206 and propagating in the circumferential direction thereof.

The elastic force of the belleville spring 208 and, hence, the pressure at which the vibrating member 206 is brought into contact with the circumferentially movable member 215 is adjusted by means of the nut 212. The pressure at which rollers 218, which will be described later, the manually operated force inputting ring 217 and the rotary cylinder 213 are brought into contact with each other is also adjusted by means of the nut 212.

Figure 11:
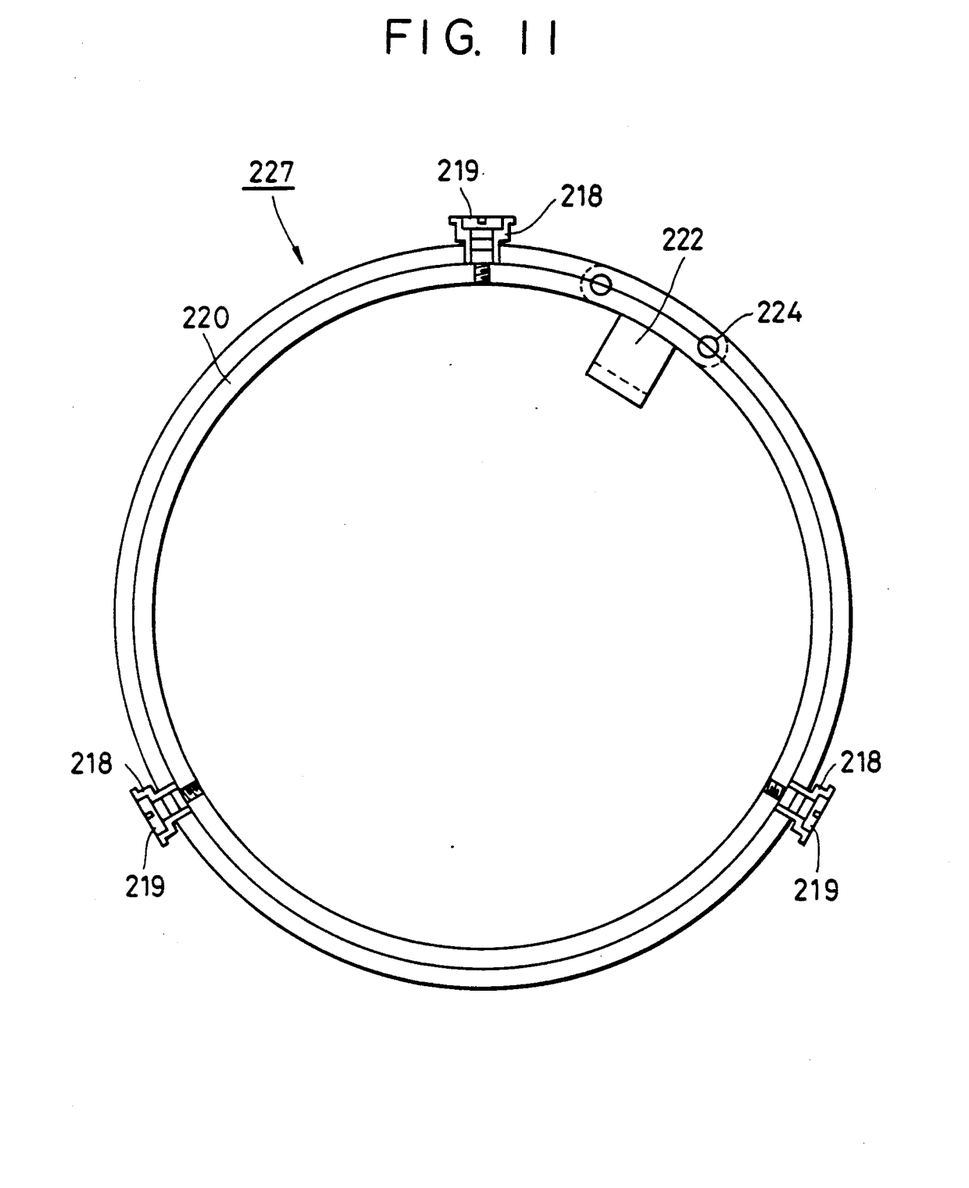
FIG. 11 is a front view of a bearing of the lens barrel of FIG. 9.

The bearing 227, which is disposed adjacent to the end surface of the rotary cylinder 213 (i.e., the rotor) of the vibrating motor 226, is comprised of a ring 220 rotatably fitted onto the outer peripheral surface of the cylindrical member 202, roller supporting shafts 219 fixed to the circumference of the ring 220 at least at three points thereof in such a manner that they protrude from the outer peripheral surface of the ring 220 along the axes which run radially from and perpendicular to the axis Z (the axis of the vibrating motor) of the ring 220, and hollow rollers 218 rotatably fitted onto the individual roller supporting shafts 219, as shown in FIGS. 10 and 11.

The ring 220 serves as an output shaft of the drive generating unit 225, and the L-shaped driving arm 222 for rotatably driving the lens holder 205 is secured to the end surface of the ring 220 by means of avis 224.

Each of the rollers 218 has a head flange 218a which is in engagement with the outer peripheral surface of the rotary cylinder 213 and the outer peripheral surface of the ring 217, by means of the roller 218 prevents backlash of the rotary cylinder 213 and of the ring 217, which would occur during the rotation thereof in the radial direction. Also, the outer peripheral surface of the head flange 218a is in contact with the end surface of the rotary cylinder 213 and that of the ring 217. The pressure at which the rollers 218 make contact with the end surface of the rotary cylinder 213 is adjusted by means of the annular belleville spring 208 and the annular nut 212 which are the components of the vibrating motor 226.

The manually operated force inputting ring 217 is rotatably fitted to the cylindrical member 201 in a state where it is in contact with the outer peripheral surfaces of the rollers 218 at one end surface thereof (the right end surface as viewed in FIGS. 9 and 10) and where it is in contact with a friction washer 221 at the other end surface thereof. The outer peripheral edge portion of the ring 217 is in engagement with a recess formed in the inner peripheral surface of the manually operated ring 204, by means of which the ring 217 is rotated by the manually operated ring 204. The ring 217 rotates only when the torque transmitted from the manually operated ring 204 is higher than the frictional resistance between the friction washer 221 and the ring 217.

Hence, the ring 217 remains unrotated unless a user of the lens barrel operates the manually operated ring 204 with a rotational torque which overcomes the frictional resistance between the ring 217 and the friction washer 221.

The lens holder driving arm 222, which is secured to the ring 220 by means of the vises 224, extends through a hole 202f formed in the cylindrical member 202 and a hole 205a formed in the inner cylinder portion 203b of the fixed cylinder 203, into the interior of the inner cylinder portion 203b and then into the groove 205a in the lens holder 205. The hole 202f formed in the cylindrical member 202 and the hole 203f formed in the inner cylinder portion 203b of the fixed cylinder 203 are groove-like holes extending in the circumferential direction.

Next, the operation of the lens barrel arranged in the manner described above will be described.

As the user of the lens barrel operates a focusing switch (not shown) and thereby drives the lens holder 205 using the force of the vibrating motor 226, a voltage is applied to the electrostrictive element 207 by the operation of a control circuit (not shown), thereby generating in the vibrating member 226 vibrations which propagate in the circumferential direction thereof. Vibrations of the vibrating member 206 cause the rotor of the motor comprising the rotary cylinder 213, the rubber ring 214 and the circumferentially movable member 215 to rotate about the optical axis Z. As the rotor rotates, the hollow rollers 218 of the bearing 227 receive rotational torque from the rotary cylinder 213. However, at that time, since the manually operated ring 204 is not in operation and hence the ring 217 is not rotated, the rollers 218 roll along the end surface of the ring 217 while rotating about the individual roller supporting shafts 219, thereby rotating the ring 220 about the optical axis Z through the roller supporting shafts 219. As a result, the lens holder driving arm 222 is pivoted about the optical axis Z together with the ring 220, and the lens holder 205 is thereby rotated about the optical axis Z and moved in the axial direction thereof for auto focusing.

When the user of the lens barrel intends to manually drive the lens holder 205 without using the force of the vibrating motor 226, he or she rotates the manually operated ring 204 about the optical axis Z without operating the focusing switch. This causes the ring 217 to rotate about the optical axis Z over the frictional resistance between the ring 217 and the friction washer 221. However, since the vibrating motor 226 is not in operation and hence the rotor of the motor is stationary at that time, the rollers 218 roll along the end surface of the rotary cylinder 213 while rotating about the roller supporting shafts. As a result, the ring 220 is rotated about the optical axis Z through the roller supporting shafts 219, and the lens holder 205 is thereby rotated and moved in the axial direction of the lens through the driving arm 222 for manual focusing.

As will be clear from the foregoing description, in the sixth embodiment, the bearing 227 for rotatably supporting the rotor of the vibrating motor is formed integrally with the vibrating motor 226 as one unit mounted on the common cylindrical member 202 that can be readily mounted in and removed from the lens barrel. This configuration of the sixth embodiment provides the following advantages in that:

(i) The vibrating motor can be tested before it is incorporated in the lens barrel.

(ii) When a failure of the vibrating motor is discovered in the test which is conducted after the vibrating motor has been incorporated in the lens barrel, the vibrating motor can be readily removed from the lens barrel without removing the bearing. Furthermore, the motor and the bearing can be readily inspected and repaired or replaced with a new one.

(iii) Assembly of the drive generating unit and that of the lens barrel can be separated, thereby improving the efficiency of the assembly of the lens barrel greatly and reducing the production cost of the lens barrel.

(iv) The porportion of non-conforming articles can be reduced, thereby achieving reduction in the production cost.

(v) Since the bearing incorporated in the unit is a roller bearing whose axes extend in the direction perpendicular to the optical axis, the vibrating motor can be readily formed as one unit at a low cost.

(vi) Since the unit including the vibrating motor and bearing includes an output member through which the rotary output of the motor is transmitted to a lens group, and an input member through which a manual operation is input, no adjustment is required after the components have been incorporated into the unit. Furthermore, since the output member can be secured to the cylindrical member separately, a highly effective vibrating motor unit can be provided.

What is claimed is:

1. A lens barrel comprising:
   a driving source including a vibrating motor having an axis of rotation;
   a rotating member driven by said vibrating motor;
   a bearing mechanism for rotatably supporting said rotating member, said bearing mechanism including a roller that rotates about an axis which extends in a radial direction of the rotational axis of said vibrating motor; and
   urging means for urging said rotating member and said roller in a direction to contact each other.

2. A lens barrel according to claim 1, wherein said bearing mechanism comprises hollow rollers which are rotatably supported on roller supporting shafts and which are disposed at at least three points on a circumference of a circle whose center is on said axis of said vibrating motor.

3. A lens barrel according to claim 1, wherein said roller has a tapered outer periphery.

4. A lens barrel according to claim 1, wherein said roller includes a flange, and wherein said rotating member includes a shoulder which bears against said flange to prevent radial backlash of said rotating member.

5. A lens barrel according to claim 1, wherein said vibrating motor is a hollow vibrating motor which is rotatable about an optical axis, and wherein said hollow vibrating motor and said roller are disposed at radial distances from the optical axis that are substantially the same.

6. A lens barrel according to claim 5, further comprising a lens which is moved in a direction parallel to the optical axis for focusing by the driving of a lens moving mechanism which is caused by the rotation of said rotating member.

7. A lens barrel according to claim 6, wherein said lens moving mechanism is driven by said rotating member which is in contact with said roller.

8. A lens barrel according to claim 6, wherein said lens moving mechanism is driven by a second rotating member which is formed integrally with said rotating member.

9. A lens barrel comprising:
a driving source including a vibrating motor having a vibrating member, a vibrated member, and an axis of rotation, said vibrating motor including an urging means for pressing the vibrating member against the vibrated member;
a rotating member driven by said vibrating motor; and
a bearing mechanism for rotatably supporting said rotating member, said bearing mechanism including a roller that rotates about an axis which extends in a radial direction of the rotational axis of said vibrating motor,
wherein said rotating member and said roller are urged by said urging means in a direction to contact each other.

10. A lens barrel according to claim 9, wherein said bearing mechanism comprises hollow rollers which are rotatably supported on roller supporting shafts and which are disposed at at least three points on a circumference of a circle whose center is on said axis of said vibrating motor.

11. A lens barrel according to claim 9, wherein said roller has a tapered outer periphery.

12. A lens barrel according to claim 9, wherein said roller includes a flange, and wherein said rotating member includes a shoulder which bears against said flange to prevent radial backlash of said rotating member.

13. A lens barrel according to claim 9, wherein said vibrating motor is a hollow vibrating motor which is rotatable about an optical axis, and wherein said hollow vibrating motor and said roller are disposed at radial distances from the optical axis that are substantially the same.

14. A lens barrel according to claim 13, further comprising a lens which is moved in a direction parallel to the optical axis for focusing by the driving of a lens moving mechanism which is caused by the rotation of said rotating member.

15. A lens barrel according to claim 14, wherein said lens moving mechanism is driven by said rotating member which is in contact with said roller.

16. A lens barrel according to claim 14, wherein said lens moving mechanism is driven by a second rotating member which is formed integrally with said rotating member.

17. A lens barrel comprising:
a driving source including a motor having an axis of rotation;
a rotating member driven by said motor;
a bearing mechanism for rotatably supporting said rotating member, said bearing mechanism including a roller that rotates about an axis which extends in a radial direction of the rotational axis of said motor; and
urging means for urging said rotating member and said roller in a direction to contact each other.

18. A lens barrel according to claim 17, wherein said bearing mechanism comprises hollow rollers which are rotatably supported on roller supporting shafts and which are disposed at at least three points on a circumference of a circle whose center on said axis of said motor.

19. A lens barrel according to claim 17, wherein said roller has a tapered outer periphery.

20. A lens barrel according to claim 17, wherein said roller includes a flange, and wherein said rotating member includes a shoulder which bears against said flange to prevent radial backlash of said rotating member.

21. A lens barrel according to claim 17, wherein said motor is a hollow motor which is rotatable about an optical axis, and wherein said hollow motor and said roller are disposed at radial distances from the optical axis that are substantially the same.

22. A lens barrel comprising:
a driving source including a vibrating motor having an axis of rotation;
a rotating member driven by said vibrating motor;
a bearing mechanism for rotatably supporting said rotating member, said bearing mechanism including a roller that rotates about an axis which extends in a radial direction of the rotational axis of said vibrating motor; and
a holder member for holding said vibrating motor, said rotating member and said bearing mechanism as one unit.

23. A lens barrel according to claim 22, wherein said bearing mechanism comprises hollow rollers which are rotatably supported on roller supporting shafts and which are disposed at at least three points on a circumference of a circle whose center is on said axis of said vibrating motor.

24. A lens barrel according to claim 22, wherein said roller includes a flange, and wherein said rotating member includes a shoulder which bears against said flange to prevent radial backlash of said rotating member.

25. A lens barrel according to claim 22, wherein said vibrating motor is a hollow vibrating motor which is rotatable about an optical axis, and wherein said hollow vibrating motor and said roller are disposed at radial distances from the optical axis that are substantially the same.

26. A lens barrel according to claim 22, wherein said holding member is detachably fixed to a fixed cylinder of said lens barrel.

27. A lens barrel according to claim 26, wherein said holding member is shaped into a cylindrical form.

28. A lens barrel according to claim 22, wherein said holding member further incorporates a rotation output member used to move a lens group, and a rotation input means for receiving rotation of a manually operated ring.

29. A lens barrel according to claim 22, wherein said vibrating motor includes a urging means for pressing a vibrating member against a vibrated member, and wherein said rotating member and said roller are urged by said urging means in a direction in which they make contact with each other.

30. A lens barrel comprising:
a driving source including a vibrating motor having an axis of rotation;
a rotating member driven by said vibrating motor;
a bearing mechanism for rotatably supporting said rotating member, said bearing mechanism including a roller having a roller supporting shaft which extends in a radial direction of the rotational axis of said vibrating motor; and
urging means for urging said rotating member and said roller in a direction to contact each other.

31. A lens barrel comprising:

a driving source including a vibrating motor having a vibrating member, a vibrated member, and an axis of rotation, said vibrating motor including an urging means for pressing the vibrating member against the vibrated member;

a rotating member driven by said vibrating motor; and a bearing mechanism for rotatably supporting said rotating member, said bearing mechanism including a roller having a roller supporting shaft which extends in a radial direction of the rotational axis of said vibrating motor, wherein said rotating member and said roller are urged by said urging means in a direction to contact each other.

32. A lens barrel comprising:

a driving source including a motor having an axis of rotation;

a rotating member driven by said motor;

a bearing mechanism for rotatably supporting said rotating member, said bearing mechanism including a roller having a roller supporting shaft which extends in a radial direction of the rotational axis of said motor; and urging means for urging said rotating member and said roller in a direction to contact each other.

33. A lens barrel comprising:

a driving source including a vibrating motor having an axis of rotation;

a rotating member driven by said vibrating motor;

a bearing mechanism for rotatably supporting said rotating member, said bearing mechanism including a roller having a roller supporting shaft which extends in a radial direction of the rotational axis of said vibrating motor; and a holder member for holding said vibrating motor, said rotating member and said bearing mechanism as one unit.

* * * * *

UNITED STATES PATENT AND TRADEMARK OFFICE
CERTIFICATE OF CORRECTION

PATENT NO. : 5,335,115   Page 1 of 2
DATED : August 2, 1994
INVENTOR(S) : Kawai, et al.

It is certified that error appears in the above-indentified patent and that said Letters Patent is hereby corrected as shown below:

On the title page item [56],

U.S. Patent Documents, "4,461,344 2/1984 Isobe et al."
    should read     --4,461,544 7/1984 Isobe et al.--

U.S. Patent Documents, "4,682,854 7/1987 Hanamori"
    should read     --4,682,854 7/1987 Hanamori et al."

Column 1

Line 14, "researches" should read --research--.
    Line 16, "have" should read --has--.
    Line 50, "tion cylinder" should read --ting cylinder 11--.

Column 2

Line 24, "arrows:" should read --arrows;--.
    Line 65, "vibrating motor 2" should read --vibrating member 2--.

Column 5

Line 62, "an" should read --a--.

Column 6

Line 36, "low" should read --lower--

UNITED STATES PATENT AND TRADEMARK OFFICE
CERTIFICATE OF CORRECTION

PATENT NO. : 5,335,115
DATED : August 2, 1994
INVENTOR(S): Kawai, et al.

It is certified that error appears in the above-indentified patent and that said Letters Patent is hereby corrected as shown below:

<u>Column 7</u>

Line 18, "hellcold 203d" should read --helicoid 203d--.
Line 32, "and as" should read --and so as--.

<u>Column 8</u>

Line 40, "avis 224." should read --a vis 224.--

<u>Column 11</u>

Line 67, "center on" should read --center is on--.

<u>Column 12</u>

Line 52, "a" (first occurrence) should read --an--.

Signed and Sealed this

Twenty-ninth Day of November, 1994

Attest:

BRUCE LEHMAN

*Attesting Officer*    *Commissioner of Patents and Trademarks*